United States Patent

[11] 3,628,744

[72] Inventor William A. Martin
    Fairport, N.Y.
[21] Appl. No. 57,250
[22] Filed July 22, 1970
[45] Patented Dec. 21, 1971
[73] Assignee Eastman Kodak Company
    Rochester, N.Y.

[54] STRIP MATERIAL HANDLING MECHANISM FOR USE WITH NONREWIND CARTRIDGES
    11 Claims, 17 Drawing Figs.

[52] U.S. Cl. .................................................. 242/55.21,
                                             242/194, 352/128
[51] Int. Cl. ...................................................... B65h 17/48,
                                                    G03b 1/04
[50] Field of Search .......................................... 242/193,
        194, 197–200, 55.21, 55.18; 352/126–128, 156

[56] References Cited
    UNITED STATES PATENTS
| 1,134,664 | 4/1915 | Bingham | 242/55.21 |
| 1,194,982 | 8/1916 | Fay | 242/55.21 |
| 1,950,601 | 3/1934 | Droll et al. | 242/55.21 |
| 2,673,734 | 3/1954 | Reza-Bek et al. | 242/55.21 |
| 3,153,517 | 10/1964 | Blank et al. | 242/55.21 |
| 3,388,873 | 6/1968 | Rosenbaum | 242/55.21 |

Primary Examiner—Leonard D. Christian
Attorneys—Robert W. Hampton and Milton S. Sales ABSTRACT: A strip material handling mechanism for use with a nonrewind cartridge of the type having a rotatable holder for both supply and takeup rolls of strip material, the takeup rolls being formed radially outwardly of the supply roll in inwardly directed convolutions as additional strip material is advanced into the cartridge. The strip material handling mechanism includes cartridge receiving and locating members to align the cartridge in proper orientation with one end of a channel formed in a guide member. Upon actuation of the mechanism, a drive member enters the cartridge to engage the leading end of the strip material, to extract the leading end from the cartridge, and to advance the strip material into the channel in the guide member. Presence of the strip material in the channel actuates a cam mechanism to axially move the cartridge and to position a feeder arm to guide the strip material back into the cartridge, thereby forming a takeup roll. As the trailing end of the strip material reenters the cartridge, mechanism is automatically actuated to cinch the strip material tightly in the cartridge rotatable holder, reforming tee supply roll, and to reposition the parts of the strip material handling mechanism to their original orientations ready to be reactuated with the same or another cartridge.

WILLIAM A. MARTIN
INVENTOR.

WILLIAM A. MARTIN
INVENTOR.

BY

ATTORNEYS

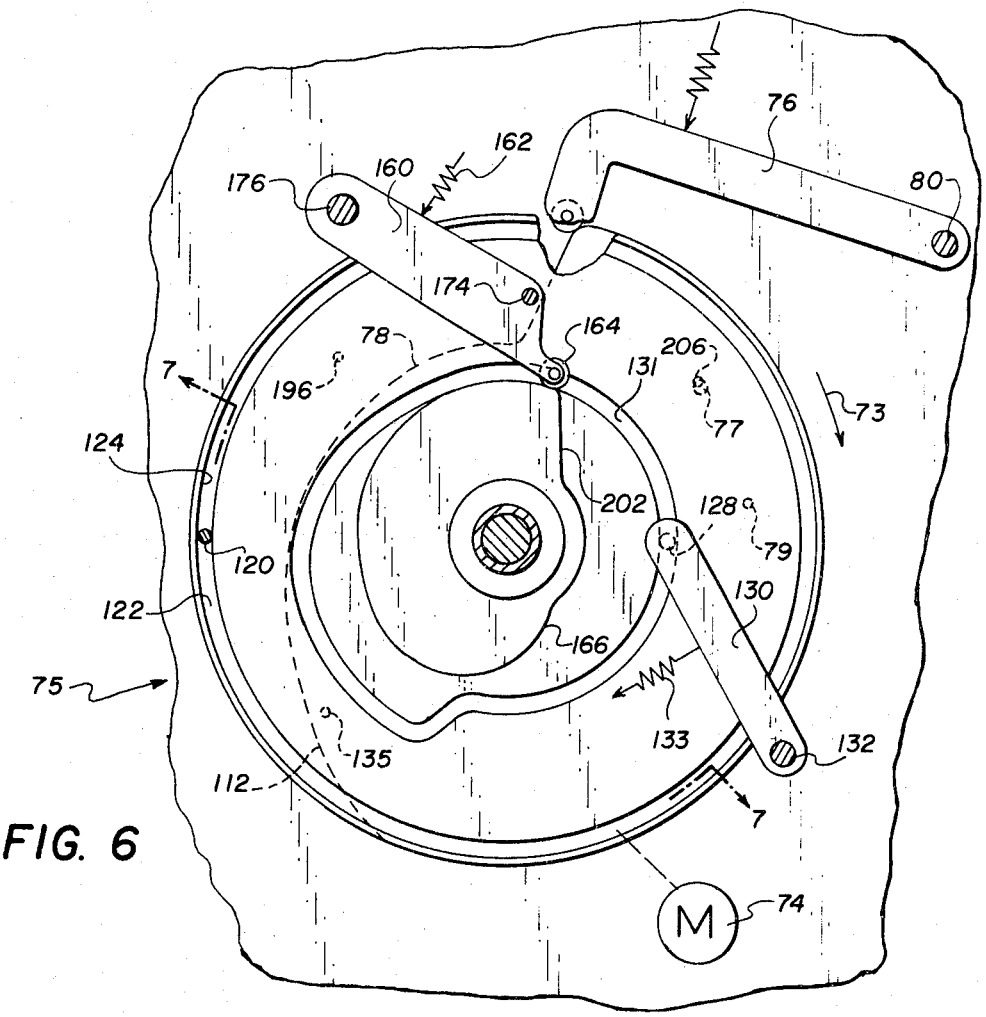

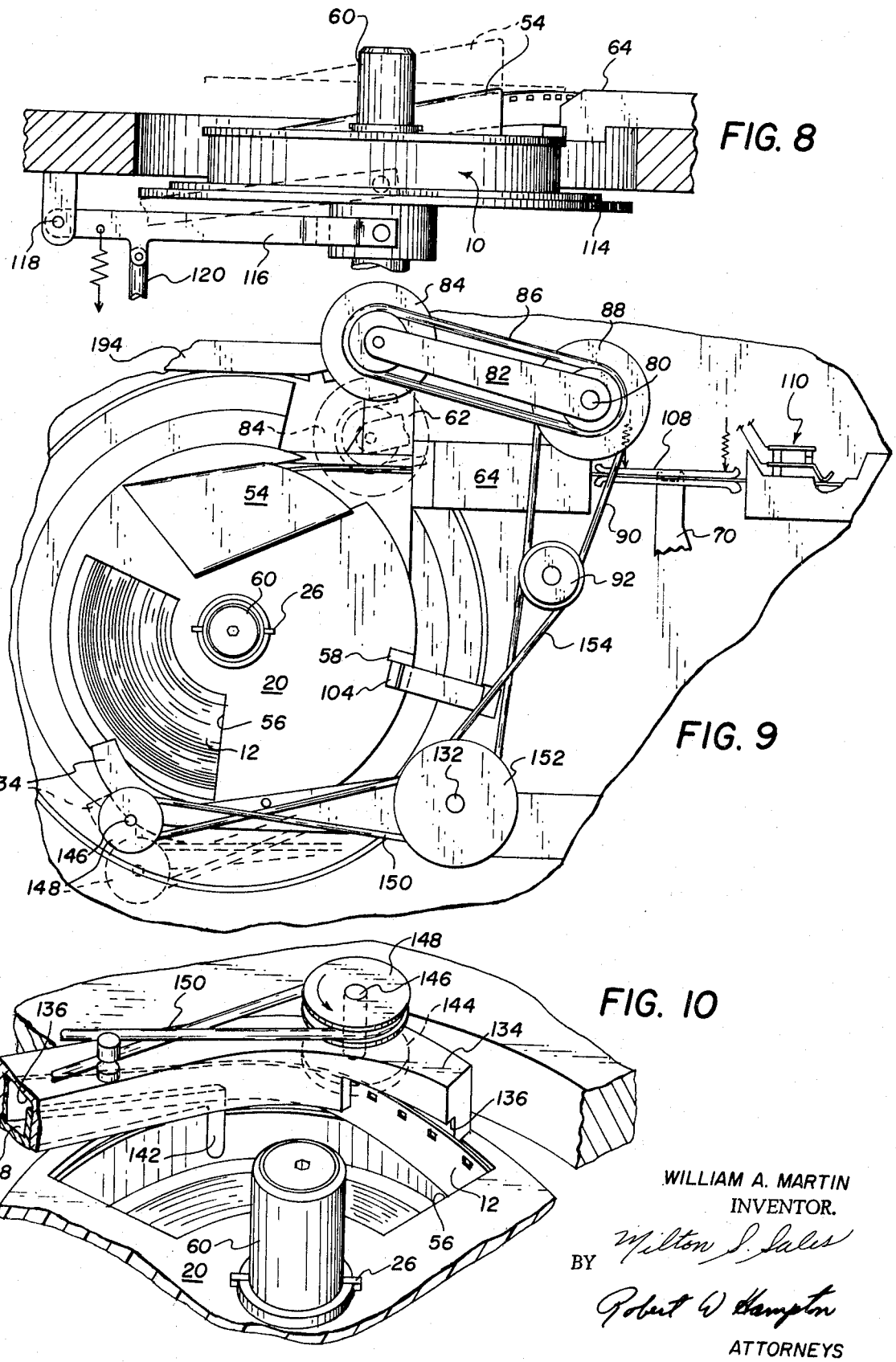

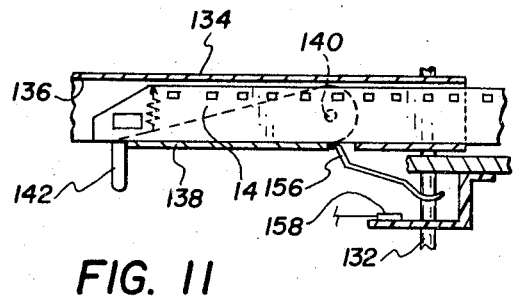
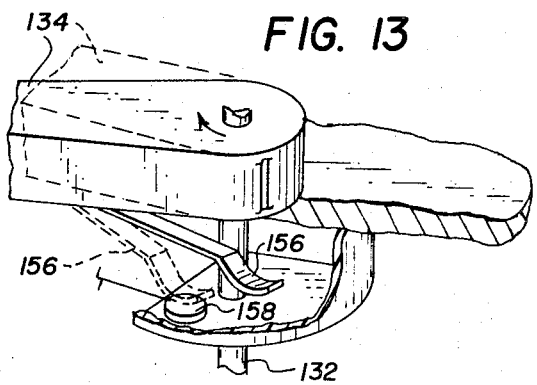
FIG. 11
FIG. 13
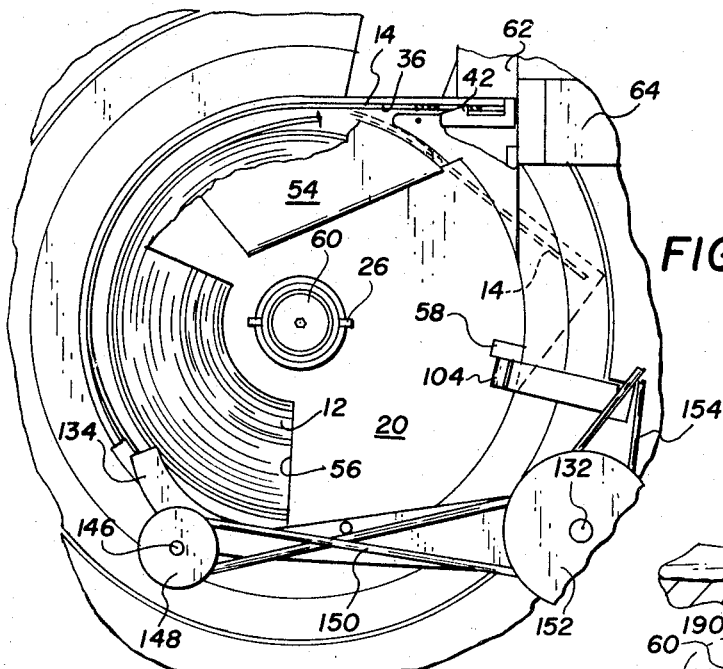
FIG. 12
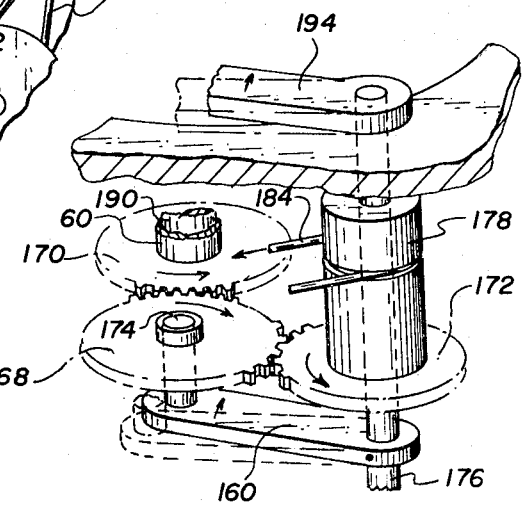
FIG. 14
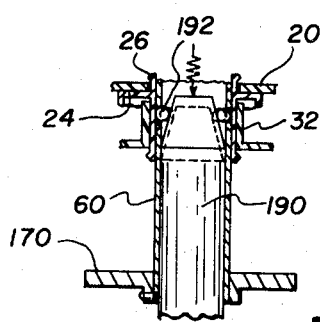
FIG. 15
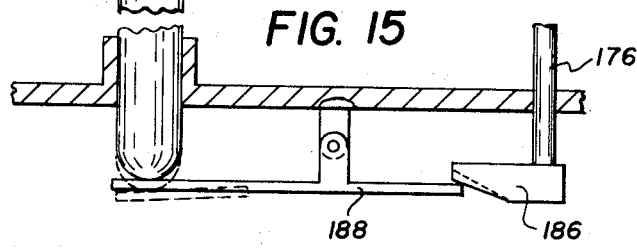
WILLIAM A. MARTIN
INVENTOR.
BY
ATTORNEYS

STRIP MATERIAL HANDLING MECHANISM FOR USE WITH NONREWIND CARTRIDGES

CROSS-REFERENCE TO RELATED APPLICATION

Reference is made to my commonly assigned copending U.S. Pat. application Ser. No. 11,268 entitled Nonrewind Cartridge for Roll of Strip Material, filed Feb. 13, 1970.

BACKGROUND OF THE INVENTION

Field of the Invention

The present invention is directed to strip material handling mechanisms for use with cartridges that contain rolls of strip material such as filmstrip and the like; and is particularly directed to strip material handling mechanisms for use with cartridges that are integral, self-contained packages arranged to hold a roll of strip material in supply form for use in an apparatus and to also hold the strip material in takeup form as the strip material is returned to the cartridge. Still more particularly, the present invention is directed to a strip material handling mechanism for use with a cartridge that requires no rewind of the strip material so that after a cinching operation, the takeup roll of strip material becomes the supply roll ready for operation again.

Description of the Prior Art

The prior art has disclosed various arrangements for eliminating the necessity of rewinding rolls of strip material so that the lead portion of a roll will be radially outwardly of the roll ready for use on an apparatus. Some of these arrangements have been so elaborate that they are commercially impractical. Some arrangements involve taking the lead portion from the inside of a roll and eventually returning the lead portion to the outside of the same roll; while other arrangements involve taking the lead portion from the inside of a supply roll mounted at one end of an apparatus and passing the lead portion to another end of the apparatus whereupon the lead portion forms the innermost convolution of a takeup roll. In the latter arrangement, the succeeding convolutions are formed radially outwardly of the innermost convolution, necessitating transfer of the second roll back to the one end of the apparatus before the roll may be ready for use again on such apparatus.

U.S. Pat. No. 1,119,489 to Bingham discloses still another arrangement to obviate the necessity of rewinding film. In that disclosure film is fed from a supply receptacle at one end of an apparatus to a receiver at another end of the apparatus, whereupon it is coiled in the receiver with the leading end of the film outermost. The film-advancing mechanism of the apparatus is used to advance the film from the supply receptacle, through the apparatus, and then to the receiver. A twisted tubular member serves to guide the film into the receiver. In passing through the tubular member, a proper curvature is imparted to the issuing end of the film to assist in the coiling action of the film in the receiver. The receiver and the tubular guiding member are movably supported relative to each other so that as the roll of film in the receiver increases in size, either the receiver or the guide moves so as to feed the film towards the center of the receiver. The film, as driven by the apparatus-advancing mechanism, passes through the tubular guide member and, as the leading end of the film issues from the guide member, the end comes into contact with the wall of a receiver. This contact of the leading end of the film causes the receiver, which is freely rotatable, to rotate. Thus, the film imparts rotation to the receiver and is automatically coiled from the periphery of the receiver inward towards the center of such receiver. After the film is completely coiled in the receiver, the film is removed from the receiver at one end of the apparatus and placed again in the supporting receptacle at the other end of the apparatus. Bingham disclosed an improvement of this arrangement in U.S. Pat. No. 1,134,664. The apparatus shown in the latter patent employs similar principles of operation to that disclosed in U.S. Pat. No. 1,119,489.

In U.S. Pat. No. 2,085,439, the patentee, Morlock, discloses another arrangement that accomplishes the same result as Bingham, and further discloses a pivotal guide arm through which the film is guided into a container. The container is caused to rotate by the leading end of the film coming into engagement with an abutment in the inner periphery of the container with the result that the film winds itself into a coil in an internal direction, or in other words, from the periphery inwardly towards the center of the container so that the film lead portion would be outermost, as is the case in the Bingham patented disclosures. Once the film is in the container, which is shown located at one end of the apparatus, the roll of film must be transferred back to the supply portion at the other end of the apparatus, as is the case in the Bingham disclosure.

Similar devices as shown in U.S. Pat. Nos. 2,673,734 to Reza-Bek et al., 3,388,873 in the name of Rosenbaum, and 3,153,517 to Blank et al.

SUMMARY OF THE INVENTION

An object of the present invention is to overcome the disadvantages of the Bingham and Morlock disclosures, wherein it is necessary to transfer the takeup roll of strip material from one end of the apparatus to the supply location at the other end before it is possible to rerun the strip material through the apparatus.

In one preferred embodiment of the invention there is provided strip material handling mechanism for use with cartridges from which strip material having a leading end and a trailing end may be advanced from a supply roll in a cartridge, leading end first, through the apparatus and returned to a takeup position in the same cartridge with the leading end of the strip material being outermost ready for use again without rewinding.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which:

FIG. 6 is a top view of a cam plate and follower arms for the mechanism according to the present invention;

FIG. 7 is a side view of the cam taken along lines 7—7 of FIG. 6;

FIG. 8 is a cross-sectional view of a portion of the mechanism shown in FIG. 1 showing the vertical positions of the received cartridge during operation;

FIG. 9 is a top view of the projector shown in FIG. 1 showing the operation of the feeding arm for returning strip material to the cartridge;

FIG. 10 is a fragmental pictorial view of the feeding arm of FIG. 9;

FIG. 11 is a fragmental sectional view of the feeding arm of FIGS. 9 and 10;

FIG. 12 is a top view of the mechanism according to the present invention with a received cartridge showing the receipt of strip material back into the cartridge;

FIG. 13 is a partial view of the feeding arm of FIGS. 9–11;

FIG. 14 is a view of the mechanism for positioning the stop arm;

FIG. 15 is a view which shows the mechanism for locking the cartridge core to the spindle for cinching;

DESCRIPTION OF THE PREFERRED EMBODIMENT

Figure 1:
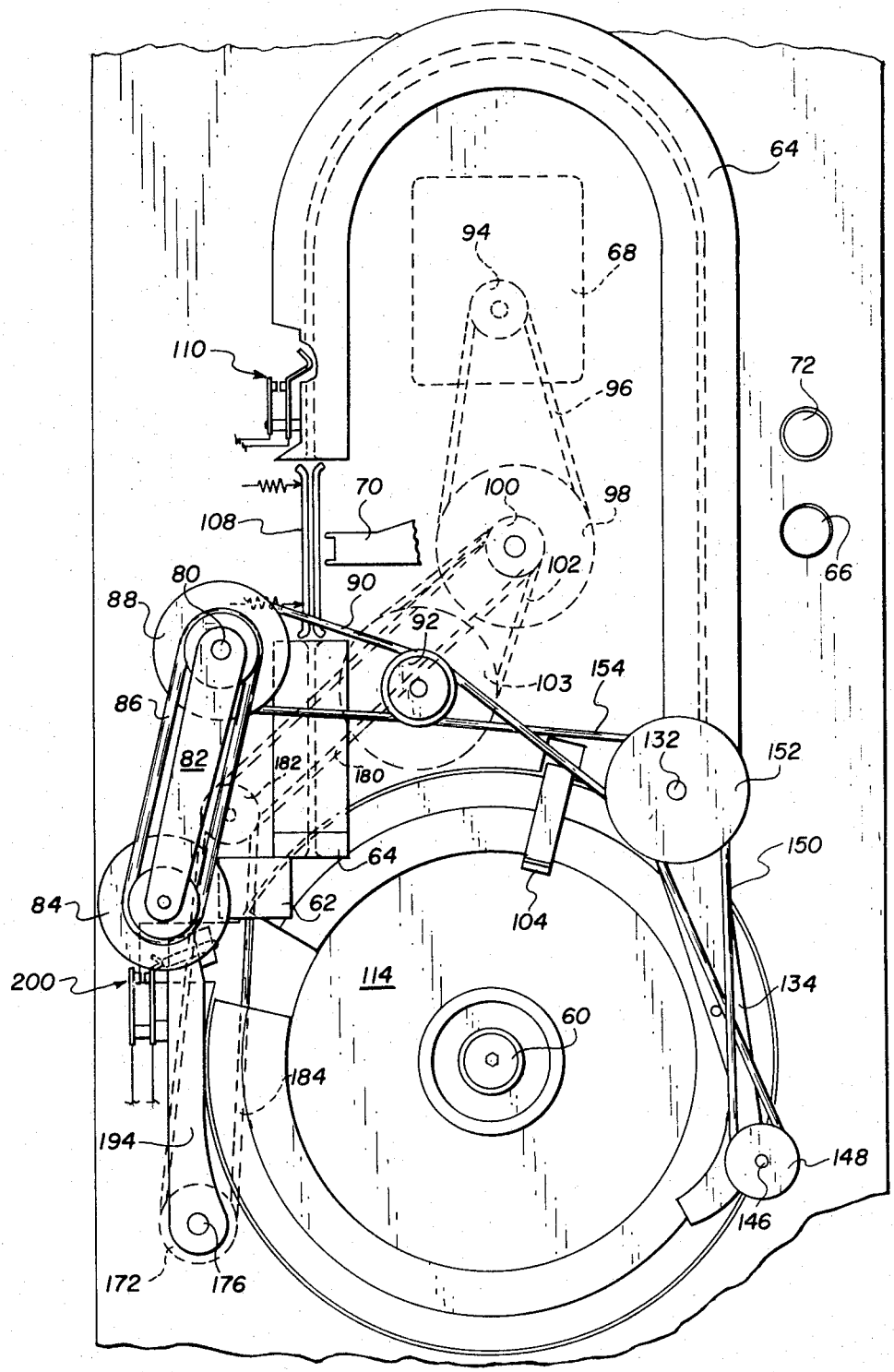
FIG. 1 is a top view of a strip material handling mechanism, such as a cineprojector, according to the present invention.

One use of the strip material handling mechanism of the present invention is in cineprojectors, and I have shown such a use as the preferred embodiment. Because projectors are well known, the present description will be directed in particular to elements forming part of or cooperating more directly with apparatus in accordance with the present invention. It is to be understood that projector elements not specifically shown or described may take various forms well known to those skilled in the art.

CARTRIDGE

The mechanism according to the present invention is adapted to receive cartridges of the type disclosed in my copending, coassigned U.S. application Ser. No. 11,268 filed Feb. 13, 1970 which is a continuation-in-part of application Ser. No. 659,938, filed Aug. 11, 1967 and now abandoned. The cartridge which I have shown in exploded form in FIG. 2 and referred to generally by reference numeral 10 is adapted to carry a strip 12 of flexible material, such as a filmstrip, having a leading end 14 and a trailing end 16, the trailing end being provided with a diagonal slot 18. Of course other types of strip material may be equally suited for use with the present invention, and I have used the word "film" herein to refer to any such form of strip material.

Cartridge 10 is formed by a top plate 20, a cup or holder 22, and a core 24. The top plate, core and cup are held together by suitable means such as molded retaining fingers or lugs 26 on core 24. Core 24 has a recess 28 on its periphery or outer surface in which a film pickup segment 30 is pivotally mounted.

Rotatable cup or holder 22 has an integrally formed hub 32 which fits within a recess 33 in core 24. A tangential extension 34 of the outer wall of the cup defines a passageway 36 leading to film exit slot 38. A stop member 40 having a lug 42 is pivotally mounted in passageway 36 by means of a pin 44 which passes through a hole 46. Stop member 40 is biased in a counterclockwise direction as viewed in FIG. 2 by a spring 48 so that lug 42 will extend through an aperture 50 across passageway 36.

Top plate 20 is formed with an opening 52 through which strip material may be stripped from cartridge 10 in a manner to be described. Opening 52 is covered by a raised portion or chute 54. A second opening 56 is formed in top plate 20 and is spaced circumferentially from opening 52. As will be described hereinafter, opening 56 provides access to the interior of cartridge 10 for feeding the lead end of strip 12 back into the cartridge. A lug 58, the purpose of which will become apparent, is formed on the top surface of plate 20.

STRIP MATERIAL HANDLING MECHANISM

Figure 3:
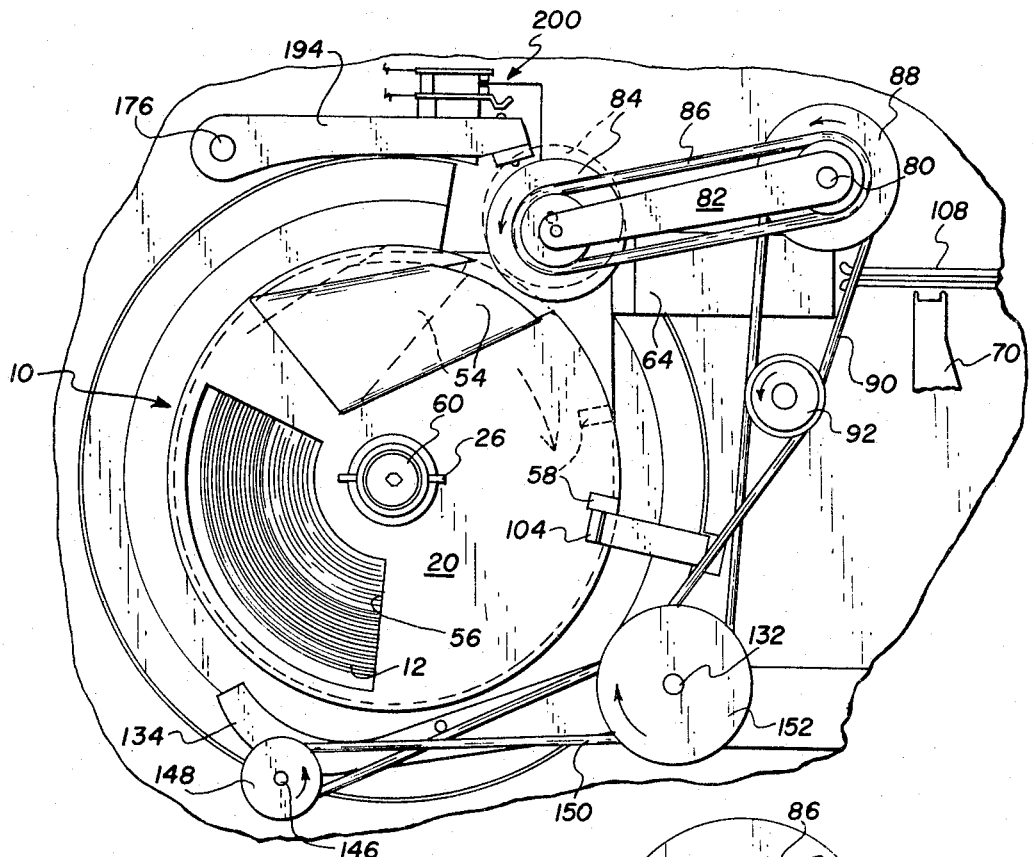
FIG. 3 is a partial top view of the mechanism shown in FIG. 1 and a received cartridge.

The illustrated embodiment of the mechanism according to the present invention is adapted to receive a cartridge such as described above. Referring to the drawings, the cartridge is placed on a spindle 60 with cup 22 oriented by the user before insertion with the protruding corner of the cup located by a sideplate 62 and guide member 64; FIGS. 1 and 3. Cartridge top plate 20 and core 24 are in no particular orientation. For instance, top plate 20 may be oriented as shown in broken lines in FIG. 3. As stated hereinbefore, the illustrated embodiment is a cineprojector. The projector has a button 66 shown in FIG. 1 which closes a switch (not shown) to actuate a motor 68 to drive a film advance claw 70, a shutter mechanism (not shown) and all other drives except that for a central timing cam to be described hereinafter. A second button 72 closes a switch (not shown) which starts a motor 74 (FIG. 6), turning a central timing cam 75 in a clockwise direction as indicated by arrow 73. This allows a spring-loaded cam follower arm 76, which rides along cam surface 78, to turn counterclockwise, turning its shaft 80 therewith. After timing cam 75 has turned through an angle sufficient to allow follower arm 76 to fully turn in a counterclockwise direction, a pin 77 on the underside of the timing cam strikes a cam timing switch 79 mounted on the projector housing to turn off motor 74 and stop rotation of the timing cam.

Now referring back to FIGS. 3–5, shaft 80 carries a stripper arm 82 upon which is mounted an upper puck 84 driven counterclockwise by a belt 86, idler pulley 88, belt 90 and intermediate shaft pulley 92. Intermediate shaft pulley 92 is driven by motor 68 through motor pulley 94, belt 96, pulley 98 on a pulldown shaft 100, belt 102 and lower pulley 103; see FIG. 1.

Figure 2:
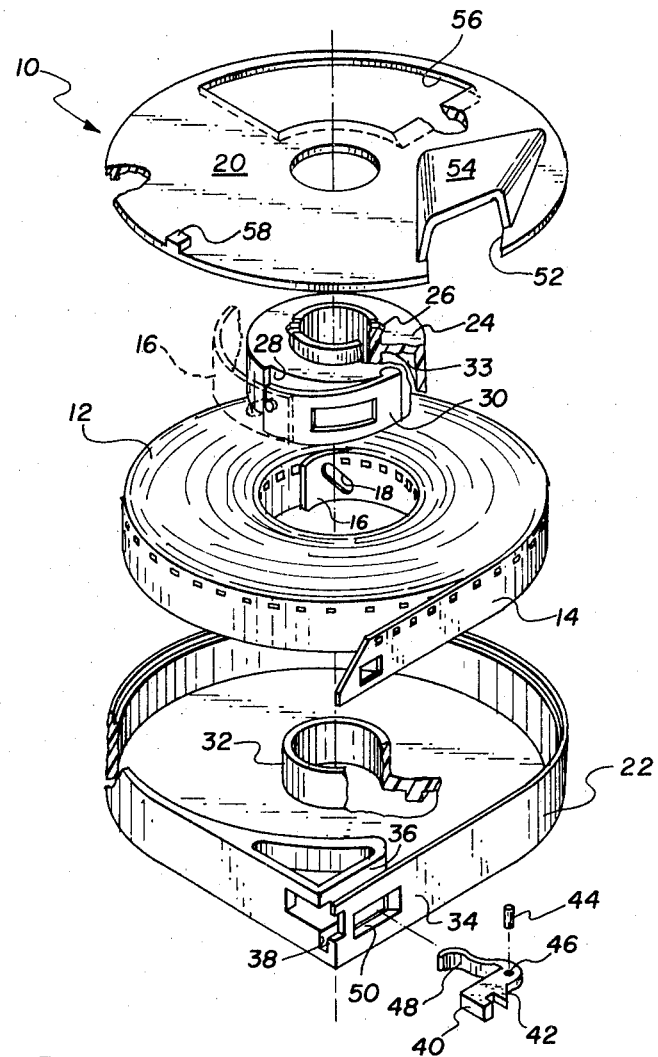
FIG. 2 is an exploded view of a cartridge adapted for use with the mechanism according to the present invention.
Figure 4:
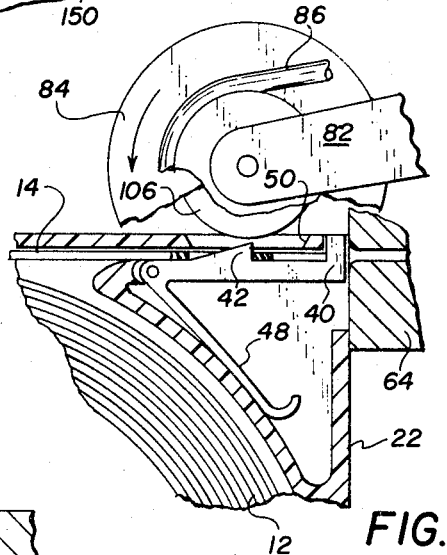
FIGS. 4 and 5 are enlarged views of the strip material feeding mechanism shown in FIG. 1 and of a received cartridge.
Figure 5:
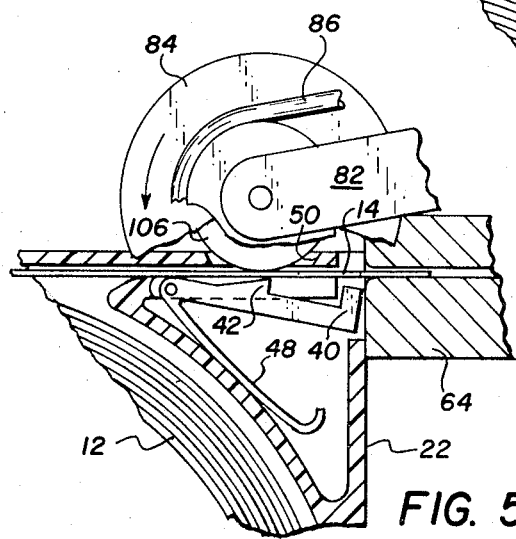

Assuming that cartridge 10 has been inserted into the projector so that top plate 20 is oriented as shown in broken lines in FIG. 3, rotation of stripper arm 82 by timing cam 75 moves upper puck 84 from its broken line position in FIG. 2 into contact with the periphery of cartridge top plate 20 to rotate the top plate clockwise until cover boss 58 rests against a hinged stop member 104 as shown in full lines in FIG. 3. Upper puck 94 then enters opening 52 in top plate 20, allowing a lower puck 106 to enter opening 50 in the protruding corner of cartridge cup 22 as shown in FIGS. 3 and 4. Lower puck 106 pushes film-holding lug 42 out of the slot in the leading end 14 of film 12 and strips the film out of cup channel 36. Puck 106 proceeds to push film through a channel formed in film guide 64 until film advance claw 70 catches the film end in gate 108. Continued film movement closes the contracts of a switch 110 shown in FIG. 1 to restart motor 74 and clockwise rotation of timing cam 75. Stripper arm 82 is returned to its original position by cam surface 112, cam follower arm 76 and shaft 80; FIG. 6.

During the period of time for the hereinbefore described film-stripping operation to occur, cartridge 10 has been supported in a raised position (as shown in broken lines in FIG. 8) by a platform 114 loosely carried on shaft 60 by a yoke 116. The yoke is pivotally mounted at 118 to the projector housing and is positioned by a cam follower 120 which rides on the lower surface 122 of a groove 124 in timing cam 75; FIG. 6. When motor 74 is restarted by the closure of switch 110 by film 12, timing cam 75 turns so that follower 120 rides down a ramp 126 (FIG. 7) to lower platform 114 and cartridge 10 to the position shown in solid lines in FIG. 8. In that position, film being withdrawn from the cartridge is lifted into the ramp area 54, of cartridge 10.

As timing cam 75 continues to rotate, another cam follower 128 on an arm 130 follows a groove 131 in timing cam 75 to rotate an arm 130 and its shaft 132 in a clockwise direction against the force of a spring 133. As seen in FIG. 9, the top end of shaft 132 is connected to a film feed arm 134 which is moved from its initial position shown in broken line radially outwardly of cartridge 10 to a position shown in full line above opening 56 in cartridge 10 (See also FIG. 10). At this point, motor 74 is shut off by pin 77 striking another cam timing switch 135.

Film continues through guide 64, pushed by film advance claw 70, and enters feed arm 134 whereupon it is fed downwardly into cup 22 of cartridge 10 by a sloped upper surface 136 inside the feed arm (FIGS. 10 and 11). Film entering the arm pushes down on a spring-loaded channel 138 which is pivoted in feed arm 134 at 140 to cause a tracking pin 142 to enter cartridge 10. As long as tracking pin 142 is in the cartridge, feed arm 134 cannot return to its original position radially outwardly of the cartridge. Pin 142 enters the cartridge when channel 138 is lowered and rests on the inside of the innermost convolution of film.

Referring to FIG. 12, as the film enters the cup, leading edge 14 follows the outside of the cup until it enters passageway 36 and is caught by lug 42. Since the cup is free to rotate, it turns as shown in broken lines by being pushed by the film as film continues to be fed into the cup from the outside inwardly. Tracking pin 142 follows the film buildup and continues to rotate feed arm 134 in a clockwise direction.

A roller puck 144 (FIG. 10) in feed arm 134 is rotated counterclockwise as viewed from above by a shaft 146, pulley 148, belt 150, pulley 152, belt 154 and intermediate shaft pulley 92. Puck 144 assists in driving film through feed arm 134 to reduce the load on the pulldown mechanism and to prevent possible skipping or vibration. Differences in film motion between intermittently driven claw 70 and continuously driven puck 144 are accommodated for by the enlarged width of the channel in guide member 64. After trailing end 16 of the film has passed film advance claw 70, the remaining portion of the film in guide 64 is withdrawn by puck 144 until feed arm 134 is clear of film. When clear of film, channel 138 in feed arm 134 is released, allowing tracking pin 142 to reenter the feed arm. Upon reentering feed arm 134, channel 138 causes a switch blade 156, FIG. 13, to close upon a contact 158, once again starting motor 74 to reinitiate clockwise rotation of timing cam 75. Contact 158 is positioned so that blade 156 cannot close upon it until feed arm 134 is swung clockwise by tracking pin 142 contacting built-up convolutions of film. This insures that the switch will close after the film leaves the arm but not before leading end 14 of the film enters the arm. Resumed rotation of timing cam 75 rotates arm 130, shaft 132 and feed arm 134 counterclockwise to their original positions.

As motor 74 continues to rotate timing cam 75 in a clockwise direction, a cam arm 160 shown in FIGS. 6 and 14 is permitted to be rotated in a clockwise direction by a spring 162 as cam follower 164 rides down cam surface 166. A gear 168 is journaled to a shaft 174 whose other end is carried by arm 160. Gear 168 is in constant meshing contact with a gear 172 which is rotatably mounted on shaft 176 with a pulley 178. Clockwise rotation of arm 160 carries gear 168 into meshing engagement with gear 170. Gear 170 is integrally attached to spindle 60 as shown in FIG. 15.

Pulldown shaft pulley 100 drives pulley 178 freely on shaft 176 by means of a belt 180, a pulley 182 and another belt 184. As explained hereinbefore, pulley 178 is attached to gear 172 which drives gear 168 and therefore gear 170 when gears 168 and 170 are meshed. At that time, spindle 60 turns in a counterclockwise direction as viewed from above.

As cam arm 160 is rotated about the axis of shaft 176, the shaft turns with the cam arm. Shaft 176 carries a wedge arm 186 which turns with shaft 176 as shown in FIG. 15. As wedge arm 186 turns, it pushes down upon one end of a pivoted lever 188 to push up a cone wedge 190, jamming balls 192 in spindle 60 against the inside of cartridge core 24. This effectively locks core 24 to spindle 60 so they turn together.

Figure 16:
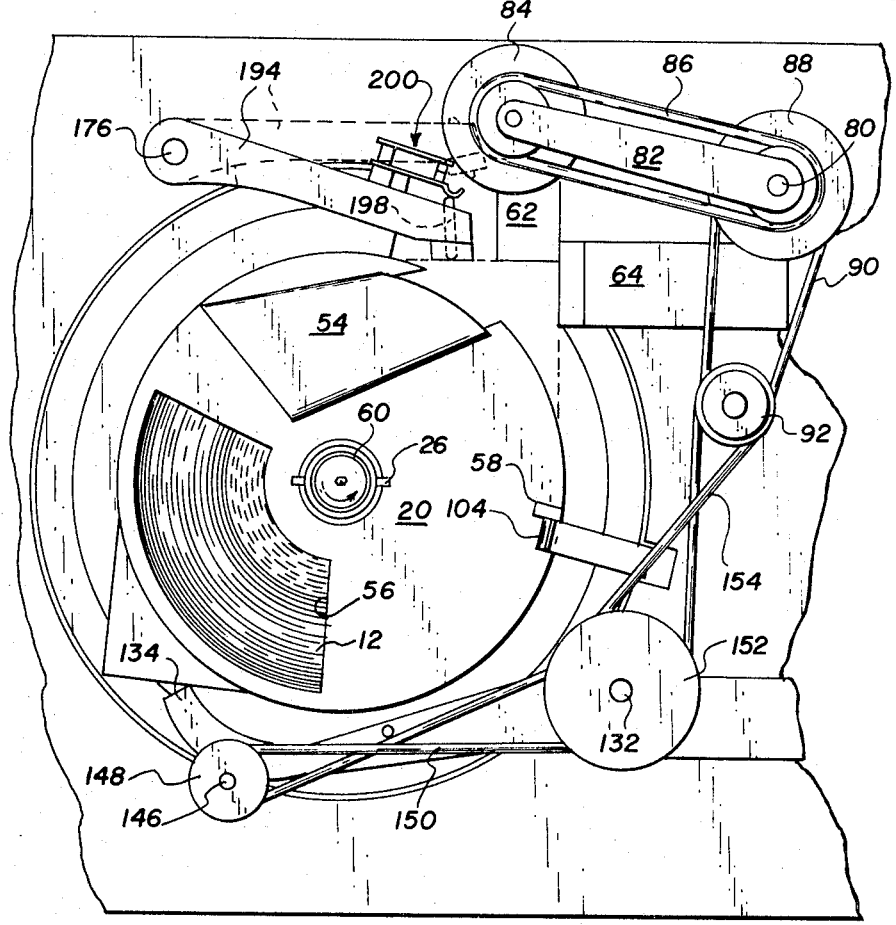
FIG. 16 is a view which shows the position of the parts of the mechanism at the end of a complete cycle.

During this time, a stop arm 194 has rotated with shaft 176 from its broken line to its full line position shown in FIG. 16. At this time, pin 77 on the lower surface of central timing cam 75 contacts cam timing switch 196 to deactivate motor 74.

Figure 17:
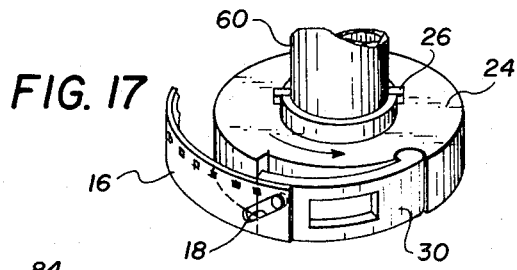
FIG. 17 is a view which shows the spindle upon which the core of a received cartridge has been shown.

Motor 68 is now rotating shaft 60 and cartridge core 24 in a counterclockwise direction as viewed in FIG. 17. Film pickup segment 30 on the cartridge core swings out and catches the trailing film end 16 of film 12 by slot 18. As the core continues to turn, the film is cinched around the core until the entire roll is tight on the core. Since the leading film end 14 is caught in passageway 36 by lug 42, the cup will begin to turn in a counterclockwise direction as seen in FIG. 16 until the tangential segment moves from a position such as shown in full lines in that figure to the broken line position in contact with a pin 198; FIG. 16. Movement of pin 198 by the cartridge tangential segment closes switch 200 to once again reactivate cam motor 74. Cam follower 164 now rides along cam surface 202 to return arms 160, 167, and 194 to their original positions. Wedge arm 186 now rotates to lower cone wedge 190 and releases cartridge core 24 from spindle 60. Stop arm 194 is moved back to its original position and gears 170 and 172 are disengaged from gear 168. Cam follower 120 rides up surface 204 in cam groove 124 to raise the cartridge to the starting position through yoke 116 and platform 114.

When the cartridge has been raised, cam motor 74 is again shut off by pin 77 tripping cam timing switch 206.

The cartridge and projector mechanism are now in their starting position with the film tightly cinched upon cartridge core 24 and leading end 14 in a position to be extracted from the cartridge cup. As can be readily seen, the cinching operation requires much less time to be performed than would rewinding of the film. The cartridge may be instantly replayed by pressing buttons 66 and 72, or it may be removed and stored for future use while another is being projected.

The invention has been described in detail with particular reference to preferred embodiments thereof, but it will be understood that variations and modifications can be effected within the spirit and scope of the invention.

I claim:

1. A strip material handling mechanism for use with a cartridge (1) containing strip material having a leading end and (2) having means defining a passageway through which strip material may be withdrawn from the cartridge, said mechanism comprising:
   a housing;
   a guide member on said housing defining a channel with an open end;
   means for receiving and locating such a cartridge on said housing such that the passageway of a received cartridge is aligned with the open end of said channel;
   means for engaging the leading end of the strip material in a received cartridge, for extracting the strip material from the cartridge leading end first, and for feeding the extracted strip material into the open end of said channel;
   means for advancing strip material along said channel through said guide member; and
   means for receiving strip material from said guide member and for returning it in the form of a roll to the received cartridge such that succeeding convolutions of returned strip material are returned to the received cartridge radially inwardly of the innermost convolution of strip material already returned from the guide member.

2. A strip material handling mechanism as defined in claim 1 wherein said means for receiving strip material from said guide member and for returning it to the received cartridge comprises an elongated feed arm having:
   first and second ends;
   a passage between said first and second ends and positioned to receive strip material from said channel in said guide member in said first end and to deliver such strip material to the received cartridge from said second end;
   means pivotally mounting said feed arm to said housing at said first end of said passage; and
   follower means mounted on said feed arm for engaging the innermost convolution of strip material already returned to the cartridge and for spacing said second end of said passage radially inwardly of said innermost convolution.

3. A strip material handling mechanism as defined in claim 2 wherein said means for receiving strip material from said guide member and for returning it to the cartridge further comprises means for disabling said follower means except when strip material is in said feed arm, whereby said feed arm is free to pivot radially outwardly of the received cartridge after all the strip material has been returned to the received cartridge.

4. A strip material handling mechanism as defined in claim 2 wherein said means for receiving strip material from said guide member and for returning it to the received cartridge further comprises means for disabling said follower means except when strip material is in said feed arm, said disabling means including:
   means defining a channel aligned with said passage for receiving strip material from said passage;
   means pivotally mounting said channel-defining means to said feed arm for rotation towards the received cartridge when strip material is in said channel;
   resilient means biasing said channel-defining means away from the received cartridge; and
   a member extending from said channel-defining means and positioned (1) to engage the innermost convolution of strip material returned to the received cartridge when said channel-defining means is rotated towards the received cartridge and (2) to clear the received cartridge when strip material is not in said channel and said resilient means moves said channel-defining means away from the received cartridge.

5. A strip material handling mechanism for use with a cartridge of the type adapted to contain coaxial supply and takeup rolls of strip material having leading and trailing ends, the supply roll having a smaller minimum diameter than the takeup roll, the cartridge also having (1) means activatable for engaging the trailing end of the strip material in the takeup roll and (2) means defining a passageway through which strip material may be withdrawn from the cartridge; said mechanism comprising:
 a housing;
 a guide member on said housing defining a channel with an open end;
 means for receiving and locating such a cartridge on said housing such that the passageway of a received cartridge is aligned with the open end of said channel;
 means for engaging the leading end of the strip material in the supply roll of the received cartridge, for extracting the strip material from the received cartridge leading end first, and for feeding the extracted strip material into the open end of said channel;
 means for advancing strip material from the supply roll through said guide member;
 means for receiving strip material from said guide member and for forming a takeup roll of such received strip material in the received cartridge such that succeeding convolutions of strip material are formed in the received cartridge radially inwardly of the innermost convolution of strip material already returned from the guide member; and
 means for (1) activating the means for engaging the trailing end of the strip material in the takeup roll and (2) cinching the strip material radially inwardly to reform the supply roll.

6. A strip material handling mechanism for use with a cartridge of the type adapted to contain coaxial supply and takeup rolls of strip material having leading and trailing ends, the supply roll having a smaller diameter than the takeup roll, the cartridge also having (1) a core upon which the supply roll may be wound, (2) means on the core for engaging the trailing end of the strip material in the takeup roll when the core is rotated in a film-winding direction, and (3) means defining a passageway through which strip material may be withdrawn from the cartridge; said mechanism comprising:
 a housing;
 a guide member on said housing defining a channel with an open end;
 means for receiving and locating such a cartridge on said housing such that the passageway of a received cartridge is aligned with the open end of said channel;
 means for engaging the leading end of the strip material in the supply roll of the received cartridge, for extracting the strip material from the received cartridge leading end first, and for feeding the extracted strip material into the open end of said channel;
 means for advancing strip material from the supply roll through said guide member;
 means for receiving strip material from said guide member and for forming a takeup roll of such received strip material in the received cartridge such that succeeding convolutions of strip material are formed in the received cartridge radially inwardly of the innermost convolution of strip material already returned from the film guide; and
 means for rotating the core in a strip material winding direction, thereby causing the engaging means on the core to engage the trailing end of the strip material and to cinch the strip material radially inwardly to reform the supply roll tightly on the core.

7. A strip material handling mechanism as defined in claim 6 wherein said means for rotating the core in a strip material winding direction comprises:
 a spindle rotatably mounted on said housing;
 means associated with said spindle and having a first mode allowing free rotation of the core of a received cartridge relative to said housing and a second mode causing the core to rotate in its strip material winding direction; and
 means responsive to the return of the trailing end of the strip material to the received cartridge for causing said means associated with said spindle to change from its first to its second mode of operation.

8. A strip material handling mechanism for use with a generally cylindrical cartridge of the type adapted to contain a roll of strip material having a leading end, the cartridge also having (1) a cup-shaped member with an upstanding, generally annular wall, (2) a passageway through the wall through which strip material may be withdrawn from the cartridge, (3) releasable means for engaging the leading end of the strip material, and (4) an aperture in the cup-shaped member adjacent the leading end engaging means; said strip material handling mechanism comprising:
 a housing;
 a guide member on said housing defining a channel with an open end;
 means for receiving and locating such a cartridge on said housing such that the passageway of a received cartridge is adjacent the open end of said channel;
 drive means on said housing and movable to a position extending at least partially through the aperture of a received cartridge for releasing said strip material engaging means and for driving the strip material through the passageway of the received cartridge and into the open end of said channel;
 means for advancing strip material along said channel through said guide member; and
 means for receiving strip material from said guide member and for returning it in the form of a roll to the received cartridge such that succeeding convolutions of returned strip material are returned to the received cartridge radially inwardly of the innermost convolution already returned from the guide member.

9. A strip material handling mechanism as defined in claim 8 wherein said drive means comprises:
 a puck rotatable about an axis parallel to the axis of the roll of strip material in a received cartridge;
 means for moving said puck at least partially through the aperture of the received cartridge into contact with the leading end of the strip material contained therein; and
 means for rotating said puck in a direction to drive the strip material out of the received cartridge through the passageway.

10. A strip material handling mechanism for use with generally cylindrical cartridges of the type adapted to receive strip material having leading and trailing ends, the cartridge further having (1) a cup-shaped member with an upstanding annular wall, (2) means defining a passageway in said wall for withdrawing strip material therethrough, (3) an inner surface on the wall, and (4) releasable means on the wall's inner surface for engaging the leading end of strip material; said mechanism comprising:
 a housing;
 a guide member on said housing defining a channel with an open end;
 means for receiving and locating such a cartridge on said housing in a first axial position wherein the passageway of a received cartridge is aligned with the open end of said channel;
 means movable to position for releasing the strip material leading end engaging means, for extracting the strip material from the cartridge leading end first, and for feeding the extracted strip material into the open end of said channel;

means for advancing strip material along said channel through said guide member;

means for moving the cartridge from its first position to its second axial position after the leading end of the strip material has been fed into said channel, whereby strip material being subsequently removed from the received cartridges first moves from such cartridge along a path having an axial component; and means for receiving strip material from said guide member and for returning it to the cartridge in a direction such that the leading end contacts the inner surface of the wall of the cup-shaped member and is engaged by the releasable means, succeeding convolutions of strip material returned from the guide member being wound in the cup-shaped member radially inwardly of the innermost convolution of strip material already returned from the guide member.

11. A handling mechanism for use with generally cylindrical cartridges of the type adapted to receive strip material having leading and trailing ends, the cartridge further having (1) a cup-shaped member with an upstanding annular wall, (2) means defining a passageway in said wall for withdrawing strip material therethrough, (3) an inner surface on the wall, (4) releasable means on the wall's inner surface for engaging the leading end of strip material, (5) a core upon which strip material may be tightly rolled, the core being coaxial with the wall and rotatable relative thereto, and (6) means on the core for engaging the trailing end of the strip material; said mechanism comprising:

a housing;

a guide member on said housing defining a channel with an open end;

means for receiving and locating such a cartridge on said housing in a first axial position wherein the passageway of a received cartridge is aligned with the open end of said channel;

means movable to position for releasing the strip material leading end engaging means, for extracting the strip material from the cartridge leading end first, and for feeding the extracted strip material into the open end of said channel;

means for advancing strip material along said channel through said guide member;

means for moving the received cartridge from its first position to its second axial position after the strip material leading end has been fed into said channel, whereby strip material being subsequently removed from the cartridge is first moved from such cartridge along a path having an axial component;

means for receiving strip material from said guide member and for returning it to the cartridge in a direction such that the leading end contacts the inner surface of the wall of the cup-shaped member and is engaged by the releasable means, succeeding convolutions of strip material returned from the guide member being wound in the cup-shaped member radially inwardly of the innermost convolution already returned from the guide member;

means for causing the trailing end engaging means to engage the trailing end of the strip material after all of the strip material has been received from the guide member by the cartridge; and means for causing the core to revolve in a strip material cinching direction to roll the strip material tightly upon the core.

* * * * *